United States Patent [19]
Ingvarsson et al.

[11] Patent Number: 5,812,721
[45] Date of Patent: Sep. 22, 1998

[54] LASER HEIGHT DETECTOR MAST

[76] Inventors: Kristjan Ingvarsson, Moaflot 51, 210 Gardabae, Iceland; Tryggvi Emilsson, 1404 S. Grove, Champaign, Ill. 61801

[21] Appl. No.: 730,786

[22] Filed: Oct. 16, 1996

[51] Int. Cl.$^6$ .................................................. G02B 6/04
[52] U.S. Cl. ...................... 385/115; 250/227.28; 385/25; 385/31
[58] Field of Search .................. 385/15, 25, 26, 385/31, 115–119, 121, 147, 12; 250/227.11, 227.14, 227.28, 577

[56] References Cited

U.S. PATENT DOCUMENTS

| | | | |
|---|---|---|---|
| 4,200,787 | 4/1980 | Carson | 250/227.28 |
| 4,435,727 | 3/1984 | Schiller et al. | 348/187 |
| 4,630,476 | 12/1986 | Moore | 250/577 X |

*Primary Examiner*—John D. Lee
*Attorney, Agent, or Firm*—Dennis H. Rainear

[57] ABSTRACT

The invention relates to a system and method for monitoring light using a photosensitive mast mounted on a support or machine. A light signal, such as a laser, is detected by the photosensitive mast which has a plurality of optical fibers distributed longitudinally along and completely around the mast. The optical fibers are of lengths which differ by very small amounts, thereby creating any desired resolution of the photosensitive mast. The optical fibers are connected to a collecting device for gathering the light signals and determining the position of the light measuring device relative to the rotating laser light source.

13 Claims, 4 Drawing Sheets

LASER HEIGHT DETECTOR MAST

TECHNICAL FIELD

The present invention relates in general to a novel light monitoring system comprising a photosensitive device. The invention is useful in many applications, such as, but not limited to, earth moving or digging machines, light distribution in liquids, and monitoring quality of sheet manufacturing, such as paper or fabric.

BACKGROUND ART

In an attempt to overcome the problems associated with measuring time, intensity and color distribution of light in many different applications, such as land surveying with laser beams, determining opacity of liquids in containers, and in foil fabrication, different types and kinds of equipment and devices have been employed. For example, reference may be made to the following U.S. Pat. Nos. 4,034,490; 4,200,787; 4,200,787; 4,491,927; 4,829,418; 4,888,890; and 5,375,663, the contents and disclosures of which are incorporated herein by reference. Laser beams have also been used to send signals to a sensor mast located on devices such as earth moving or digging machines. Laser beam detectors for use in positioning earth moving equipment have been cumbersome, expensive, frequently require moving mechanical parts, or do not have sufficient sensitivity or ability to receive a laser beam from any direction.

U.S. Pat. No. 4,034,490 describes a depth control for a trencher. A photosensing system is presented in which the device is limited to laser beam sensors mounted on the top end only of a vertical mast. The laser detector has a limited range and therefore it is mounted on a mast that transports said sensor vertically to track the laser beam. In addition, the mast must be maintained in a true vertical position irrespective of the angular position of the digging machine on which it is mounted. This is obviously cumbersome and lends itself to malfunction and damage.

U.S. Pat. No. 4,200,787 describes an omnidirectional fiber optic laser beam sensing apparatus in which a plurality of optical fibers are arranged to receive an optical signal directly into receiving ends of the fibers. Such a device has limited sensitivity, is expensive to build and cumbersome to manufacture. Furthermore, this device can only detect one signal at a time.

U.S. Pat. No. 4,491,927 teaches a depth monitoring system for excavators. It has no means of reference to a laser. The device of the present invention is well suited to complement this type of monitoring system.

U.S. Pat. Nos. 4,829,418; 4,888,890 and 5,375,663 describe means of relating the position of the digging implement of earth moving equipment to a laser beam through cumbersome laser sensors of poor resolution and limited range.

Therefore, it would be highly desirable to have a light monitoring system which is inherently more accurate in its measurement, is relatively simple in design, has few moving parts, and is able to receive a signal from anywhere within 360 degrees.

Therefore, one object of the present invention is to provide a new and improved light monitoring system, which is highly accurate, simple in design and construction, and economically feasible.

Another object of the present invention is to provide a method for measuring the depth of an excavation or hole.

Yet another object of the present invention is to provide a novel photosensing device, useful in, for example and not by limitation, digging and earth moving machines, and machines which manufacture sheeting such as paper or fabric where a light monitoring system can be used to detect defects in the extruded sheet.

BRIEF DISCLOSURE OF INVENTION

The above and further objects are realized in accordance with the present invention which is directed to a novel photosensitive mast used to detect a light signal transmitted directly or indirectly from a source.

Thus, the invention relates to a light monitoring system comprising a) a photosensitive mast comprising a plurality of optical fibers of varying lengths, each of said fibers having a receiving end and a terminal end and said fibers being gathered into a bundle, one end of which comprises the terminal ends of the fibers and said bundle end is cut and polished; and b) a means for collecting from the polished end of the optical fiber bundle electromagnetic radiation signals received by the photosensitive mast. The time, color and distribution of the light can be monitored simultaneously by the present invention.

In general, the invention resides in an improved apparatus for sensing the time, wavelength and location of the source of a received beam or signal of light. The apparatus of the present invention includes a plurality of optical fibers of varying lengths and arranged in a permanent pattern, whereby a light beam can be detected anywhere within 360 degree of the apparatus. The invention is useful for but not limited to a depth measuring device for earth moving or digging machines, and is applicable to any operation benefiting from an improved photosensitive mast to receive signals from a photon source. Thus, for example, a military vehicle equipped with a device of the present invention could be easily and accurately tracked during various exercises. In addition, laser beam detecting systems used for positioning purposes in land surveying are also applications of the present invention.

Monitoring the opacity and color of liquids in a sea, lake or vessel is also improved with the light monitoring system of this invention. The present invention is directed to a light monitoring system in many areas where illumination is to be measured over a range, point by point, or simultaneously.

By "light" herein is meant any electromagnetic radiation signal generally in the wavelength range of from about 400 nanometers (nm) to about 2,500 nm. Laser beams emitted from commercially available lasers are examples of the light contemplated herein.

BRIEF DESCRIPTION OF DRAWINGS

In describing preferred embodiments of the invention, specific terminology will be resorted to for the sake of clarity. However, it is not intended that the invention be limited to the specific terms so selected and it is to be understood that each specific term includes all technical and structural equivalents, as well as equivalent structures which operate in a similar manner to accomplish a similar purpose.

DETAILED DESCRIPTION

More specifically, the invention is directed to a light monitoring system, said system comprising:

an omnidirectional photosensitive mast comprising a plurality of optical fibers of varying lengths capable of receiving an electromagnetic radiation signal in the wavelength range of from about 400 mn to about 2500 mn.

In another embodiment, the photosensitive mast is combined with a means for collecting the electromagnetic radiation signals received by the photosensitive mast.

In a more preferred embodiment, the light monitoring system of the present invention is ideal for measuring the depth of a hole or excavation dug by an earth moving machine by monitoring the length of the specific optical fiber within a mast bundle of fibers illuminated by a rotating laser beam and then finding the position of the base of the mast relative to the height of the laser beam. The depth of the excavating attachment, e.g., a bucket, can then be measured with an excavator depth monitoring system, such as that described in U.S. Pat. No. 4,491,927.

The present invention is also directed to an improved omnidirectional photosensitive mast comprising a plurality of optical fibers of varying lengths capable of receiving from a 360 degree arc an electromagnetic radiation signal in the range of from about 400 nm to about 2500 nm. In a preferred embodiment, the electromagnetic radiation signal is a rotating laser beam.

Figure 1:
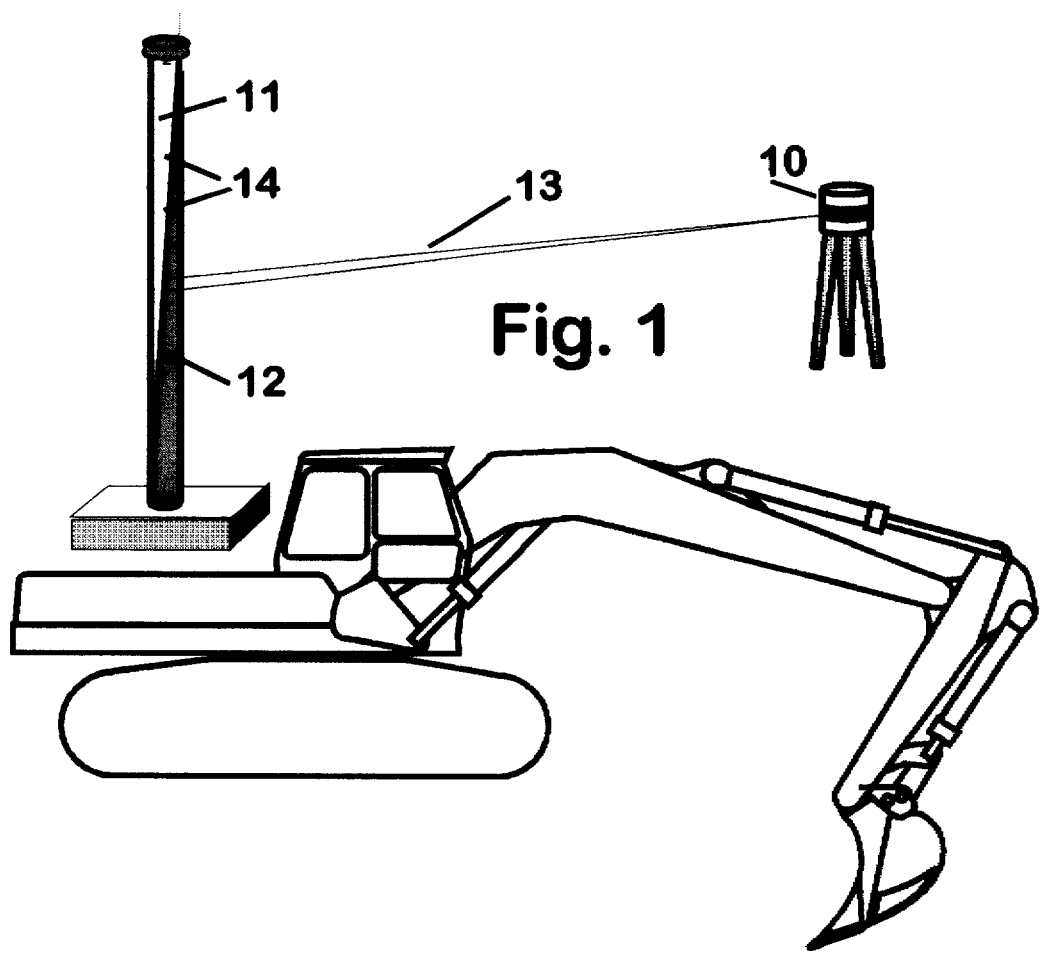
FIG. 1 is an illustration of a photosensitive mast of the present invention.

In one embodiment, the photosensitive mast of the present invention has optical fibers which are aligned along and around a core or support such as a rod, post, or pole wherein the ends of the optical fibers are spaced incrementally along the length of the rod, for example, as shown in FIG. 1.

According to the best mode for carrying out the present invention, the photosensitive mast can be, but is not limited to, a rod of acrylic or other plastic vertically mounted on a support, and longitudinally around said rod are aligned uniformly the plurality of optical fibers whose receiving ends are distributed at very small intervals. In this preferred embodiment, at least one optical fiber has a receiving end, positioned longitudinally along the length of the rod, for example, every 1 millimeter. Reducing the distance between the various ends, i.e., reducing the difference in the lengths of the optical fibers, improves the resolution of the photosensitive mast, and thus in its applications in the light monitoring system and depth measuring method of the present invention. The light impulses can therefore be detected with a uniform efficiency. The receiving ends of the optical fibers terminate at different locations along the length and around the circumference of the rod. The optical fibers are bundled together whereby the terminal end of said bundle is oriented to direct any light emitted therefrom to a collecting means. Each fiber is thereby individually connected to the collecting means so that each received signal can be used to calculate time, color and position of the light relative to the position of the light monitoring system. When light from the rotating laser beam is received by one of the optical fibers in the mast, the light is transmitted along that fiber to its terminal end in the fiber bundle end.

Thus, the photosensitive mast, when mounted vertically on a support, device or machine, can detect and receive a light signal transmitted from a light source 360 degrees around said mast. The light source can be ground based, positioned on a pole or elevated platform, or mounted on another vehicle, as long as the location of the light source is known or knowable.

In a preferred embodiment, several hundred or more optical fibers of varying lengths, can be arranged around the mast to improve the resolution to receiving the light signal from the light source. In a more preferred embodiment, several thousand optical fibers are employed in the bundle.

In another embodiment, the photosensitive mast has no core or rod, but comprises a bundle of optical fibers of varying lengths, similar to a very long and thin whisk broom. In this embodiment, the optical fibers are bundled together and wound, or wrapped, or imbedded in a curable plastic or other material, or inserted into a tube or otherwise adhered together and connected to the means for collecting the light signal as hereinafter described.

In a more preferred embodiment, the light source is a rotating light source which emits a laser beam. According to the present invention, the lateral surfaces as well as the ends of the optical fibers are exposed to the laser beam but only the ends of the optical fibers convey the light to the collecting means. Fibers that are exposed laterally to the laser beam will fan or scatter the laser light in a horizontal plane, if the fiber bundle is vertically mounted. Thus the fanned light will expose the endings of fibers that are embedded deeper in the bundle of fibers. In this manner, each optical fiber can serve as a lens to diffuse, refract and/or focus incoming light into the adjacent fiber and/or closest receptive end. This fact makes the mast sensitive to light coming from any direction and makes the embodiment superior and contrary to the teachings in U.S. Pat. No. 4,200,787 in which the receiving ends of the optical fibers must be arranged in such a manner as to detect the light from the surface of the sensor.

Thus, one advantage of the present invention is the increased photon reception and therefore sensitivity of the present invention by means of using the entire length of the optical fiber to convey the light signal to the proper receiving ends, instead of only the very limited surface area of the receiving ends of the optical fibers.

Another advantage of the present invention is the ability to economically and effectively use a large number of optical fibers, perhaps 2,000 fibers or more, in a two meter mast. Such a large number of optical fibers in the prior art devices would be extremely difficult and expensive to individually orient and position so as to expose the receiving ends to the light source.

The receiving ends of the optical fibers used in the present invention need not be flat or polished and, in fact, an irregular receiving end on the optical fibers can serve to increase the refraction of light into the optical fiber.

Similarly, the receiving end of the optical fiber can be an angled polished cut.

In another embodiment of the present invention, the photosensitive mast is connected to a device or means for focusing the light signals from the optical fibers. The device or means for collecting this light pattern can be, for example, a charge coupled device, similar to that used in television image receptors. The charge coupled device preferably contains more photoelements than the number of optical fibers in the photosensitive mast. Thus, each optical fiber can illuminate more than one element in the charge coupled device, whereby enhanced signal definition is achieved. By way of example and not as a limitation of the present invention, the charge coupled device used in the present invention can have 100 to 5,000 optical fibers in the mast and 340×200 pixels or 68,000 phototransducers in the charge coupled device.

The terminal ends of the optical fibers are preferably bundled and polished and the bundle is optionally contacted to a means for focusing the optical signal carried in the optical fibers. The focusing means, if used, can be a glass or plastic lens, or any material able to direct, focus, filter or desirably alter the optical signal. The fiber bundle and lens, if any, are then positioned on or near the charge coupled device, whereby the charge coupled device can perceive the image of the polished end of the fiber bundle. In this manner, the charge coupled device acts much like a camera taking a picture of the light pattern presented at the polished end of the fiber bundle. Since the bundle is a collection of fibers capable of receiving a signal from 360 degrees, the polished end of the bundle will have, for each optical signal received from the rotating laser light, one or a few optical fibers illuminated by the incoming signal. Thus, a specific illumination pattern, or singularly illuminated fiber terminal end, designates a specific time, intensity and color of the incoming light signal from the source. This requires that the optical fiber bundle be permanently adhered to the charge coupled device so that a specific "picture" taken by the charge coupled device of the illumination pattern on the polished end of the bundle will always and reproducibly represent the same optical fiber(s) receiving the incoming signal.

In a preferred embodiment, the polished end of the optical fiber bundle, the lens and the charge coupled device are all encased or enclosed in one solid single unit, whereby their relative positions remain fixed.

The illumination image or "picture" which the charge coupled device receives from the polished end of the optical fiber bundle is converted by the charge coupled device to a signal which is sent to a computer in a manner to coordinate each particular image with a specific optical fiber. Since the orientation of the fibers is fixed, the location of the light source can be calibrated for each illumination image. This calibration information is then stored in the computer in a reference library or "look-up" table of optical images. The signal ideally goes from the "camera" to the processing unit of the computer which is an output for downstream use or multiple end uses. Electronic circuitry for amplifying the signals produced by the phototransducers in the charge coupled device and for suitably processing such amplified signals can be disposed within the solid single unit connecting the optical fiber bundle end, the lens and the charge coupled device.

The information stored in the computer can be sent to a display, such as a video monitor or television screen.

As further explanation of the present invention and not by way of limitation, FIG. 1 illustrates one embodiment wherein the photosensitive mast comprises a translucent rod 11 which is surrounded by optical fibers 12 of varying lengths, the receiving ends 14 of which receive the electromagnetic radiation 13 which is emitted from a horizontally rotating laser beam 10. Even if the receiving end 15 of the fiber is on the "shadow" side of the mast, it will receive the optical signal through the material of the clear or translucent rod 11.

Figure 2:
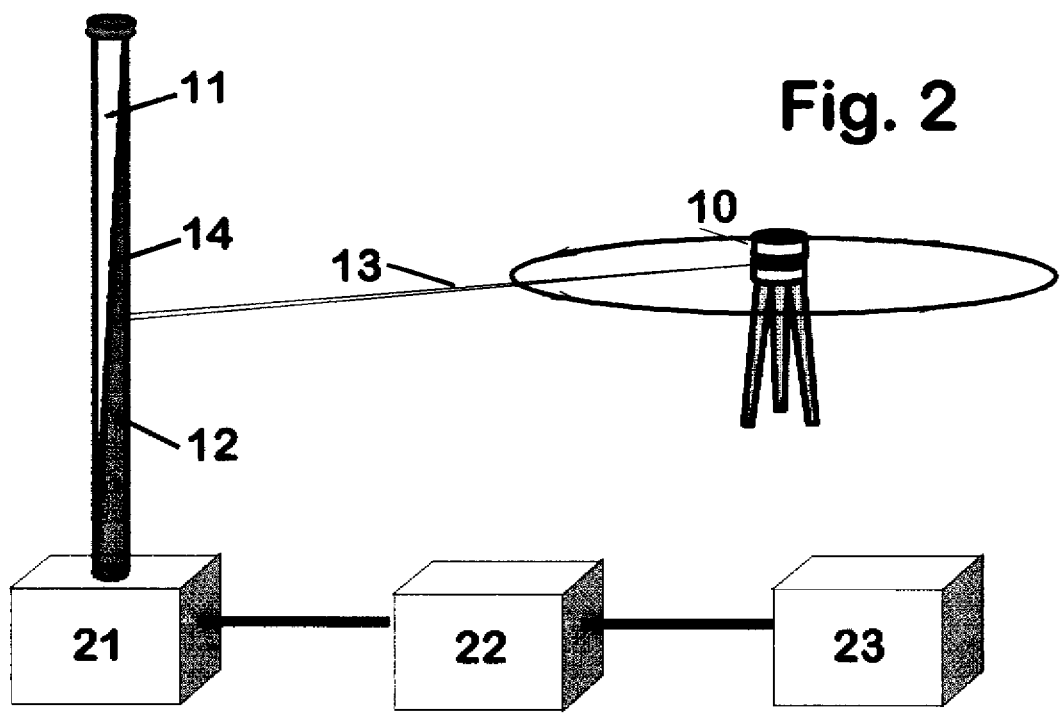
FIG. 2 is a block diagram of the components of one embodiment of the present invention.

FIG. 2 illustrates a schematic of the present invention wherein the rod 11 and optical fibers 12 are connected to the collecting means 21 such as a charge coupled device, whereby the signals 13 from the source 10 are received and transferred to the collecting means 21. The collecting means 21 is preferably connected to the computer memory 22 whereby information such as the illumination pattern on the polished end of the optical fiber bundle can be stored, retrieved and calculations performed, to produce information which can be sent to the display 23.

Figure 3:
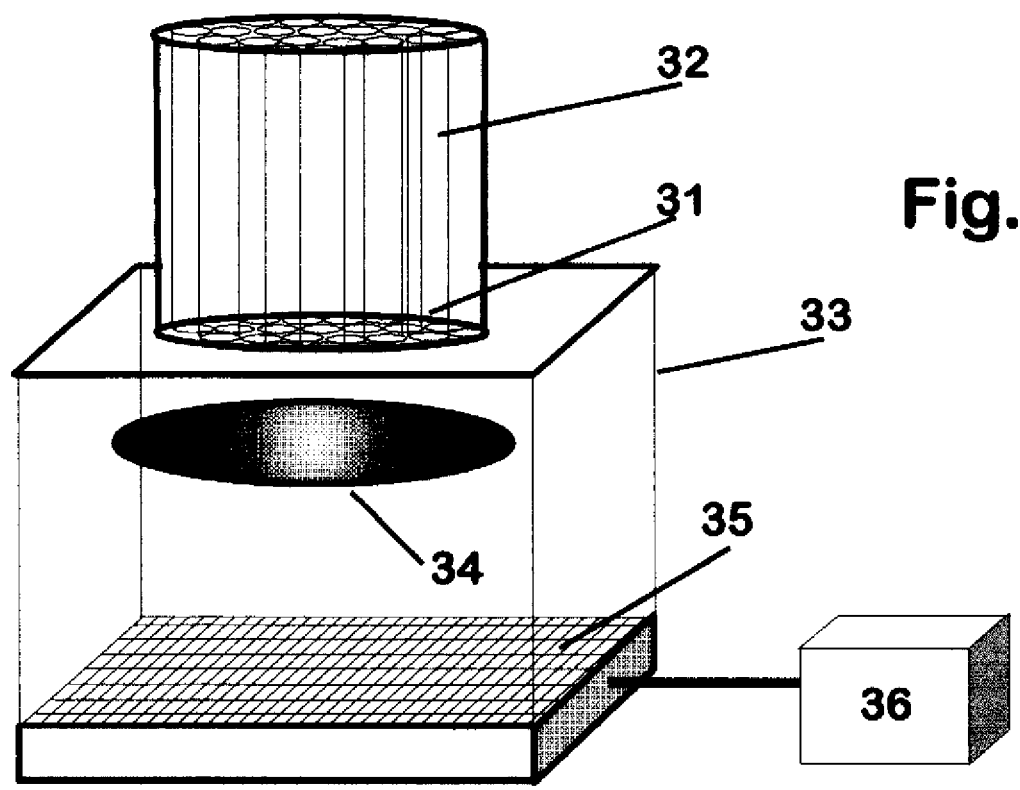
FIG. 3 is an illustration of the projection mechanism from cut and polished end of the fiber optic bundle to the charge coupled device.

FIG. 3 illustrates one possible positioning of the polished end 31 of the optical fiber bundle 32 into the solid unit 33 adjacent the focusing lens 34. The charge coupled device 35 is shown in FIG. 3 as a grid-like screen containing many thousand pixels and which is receptive to the "picture" or illumination image on the bundle's polished end 31. The transducers in the charge coupled device pick up and transmit this illumination image to the computer 36. Such charge couple devices, both black & white and color, are commercially available and known to those skilled in the art.

By use in the present invention of a color charge coupled device, three pixels are present for each cell; one for blue, one for red; and one for green. Thus, according to an embodiment of the present invention utilizing a color charge coupled device, different color (or wavelength) light sources can be simultaneously detected. In addition, charge coupled devices can be utilized herein which detect infrared or other desired wavelengths and the resulting images can be similarly received and stored for correlation in the computer.

Figure 4:
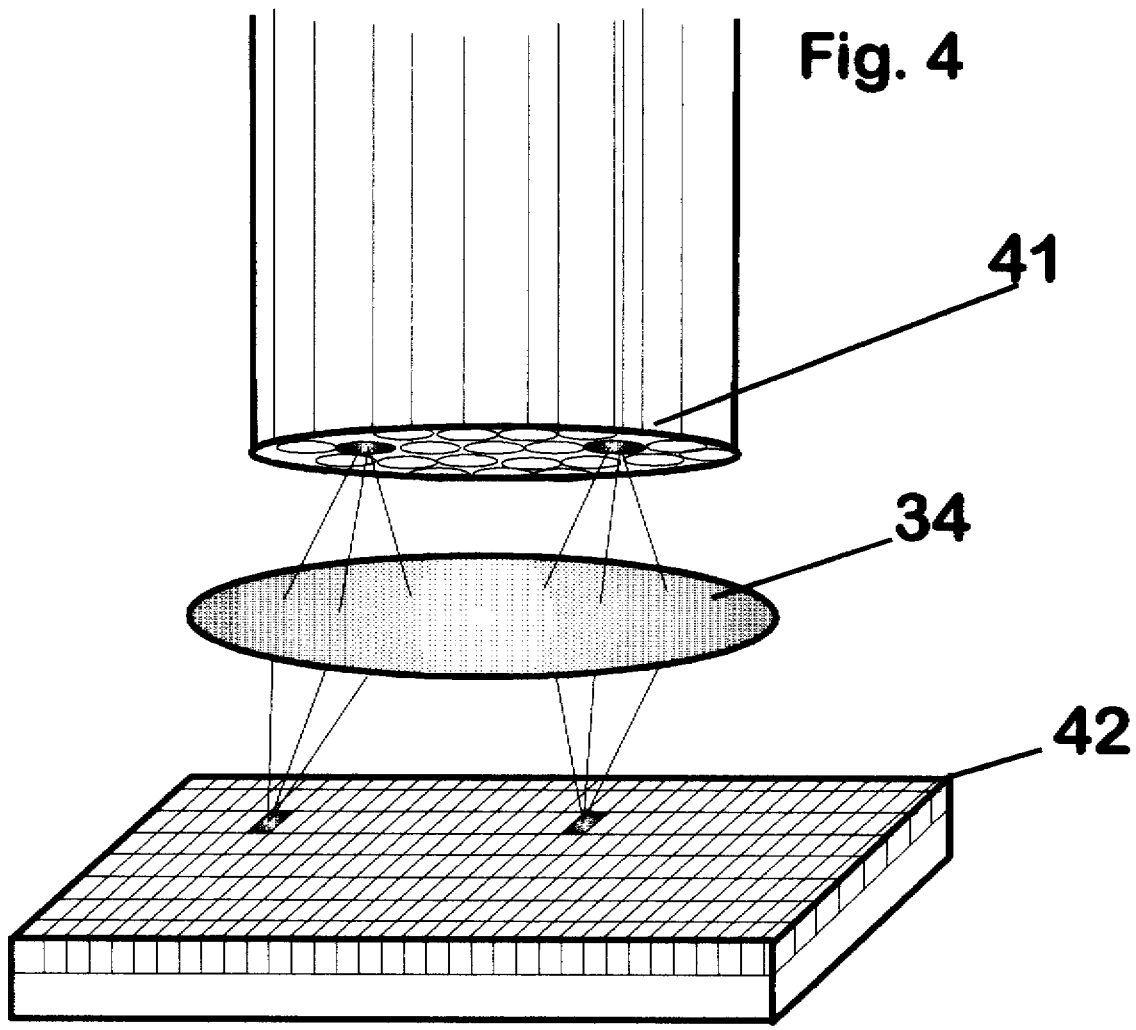
FIG. 4 is a perspective view of the polished end of the optical fiber bundle, showing an illumination pattern image.

FIG. 4 shows a cross section of the polished end of the optical fiber bundle 41 with a depiction of two fibers which have been illuminated by the lateral impingement of two laser beams. This image of the end of the bundle would be focused by lens 43, detected and transmitted by the collecting means 42, such as a charge coupled device. The position and timing of two or more laser beams can therefore be detected simultaneously by the present invention.

Yet another embodiment of the present invention is the improvement in photosensitive masts, said improvement comprising a plurality of optical fibers of different lengths arranged along and around a rod or mast, whereby a laser beam or other electromagnetic radiation can be received by a select one or more optical fibers on the mast, to thereby accurately and with high sensitivity relay optical information which can be translated into an electrical or electronic signal representative of depth, elevation, or position of the photosensitive mast relative to the beam source. In the improved photosensitive mast of the present invention, the ends 14 of the optical fibers 12 are spaced incrementally along and around the length of the rod 11.

One advantage of the present invention relative to prior art sensors is that because the optical fibers used herein have receptive ends located all the way around the mast and at short intervals or increments, the photosensitive mast is omnidirectional, that is, any segment is and all segments of the mast are photosensitive. In this manner, speed and accuracy of measurement in every direction is improved relative to conventional optical signal measuring systems.

Another advantage of the present invention is that the rotating nature of the laser light source allows the machine, device or support upon which the photosensitive mast is located a much greater range of motion than in prior art unidirectional sensing devices. In addition, the light source can be positioned virtually anywhere convenient to the reception or detection site since the rotating light source will project the signal in a complete circle and can be detected by the photosensitive mast(s) on one or more machines from any direction.

The beam width of the light signal useful herein is preferably 0.0125 inch to about 2.0 inches in diameter at a range of 1000 feet. The resolution of the device of the present invention will depend on the differences in the lengths of the optical fibers in the bundle. Because of the close vertical spacing of the receiving ends of the optical fibers and the high number of fibers, the light will always impinge on at least one fiber as the mast intercepts the signal. When two or more fibers are illuminated, the computer will calculate the center of the intensity of the beam, thus giving excellent resolution, even at a large distance from the laser source.

In a separate embodiment of the present invention, the light source is positioned at an elevation above the light monitoring site and two or more light monitoring units can operate simultaneously utilizing the same rotating light source signals. In this embodiment, the photosensitive mast may be vertically mounted or horizontally mounted or some combination or intermediate thereof, depending on the height of the light source and the angle of the incoming signal relative to the horizontal. Thus, for example, in the excavation of a very large building site, or the dredging of a river bed, or the leveling of a road bed or airport runway, or the mining of an open strip or pit mine where dozens of earth moving or digging machines may be simultaneously operating, each machine equipped with the omnidirectional photosensitive mast of the present invention can rely on the same rotating laser light source.

Thus, the present invention also provides an improved method for monitoring the orientation or direction of an electromagnetic radiation signal, said method comprising sequentially or simultaneously the steps a) transmitting an electromagnetic radiation or photosignal from an electromagnetic radiation source;

b) receiving the signal by means of an omnidirectional photosensitive mast comprising a plurality of optical fibers of varying lengths capable of receiving the electromagnetic radiation or photosignal;

c) collecting in a collection means said electromagnetic radiation or photosignals received by the photosensitive mast; and d) converting the collected electromagnetic radiation or photosignals to information upon which mathematical calculations can be performed to determine various parameters, such as the position of the photosensitive mast relative to the electromagnetic radiation source.

The present invention can further comprise a computer memory to receive and retain the information from the collecting means. The computer can also store (a) information on the calibration of the mast, and (b) a program or algorithm to calculate the relation between the pattern of light on the end of the polished fiber bundle and perceived by the charge coupled device and the specific position on the photosensitive mast where the electromagnetic radiation signal struck. The best means for realizing these calculations lie within the realm of fuzzy logic and artificial intelligence. In this manner, the invention provides a light monitoring system on a machine to receive a signal from a source, transfer the signal to a computer, and calculate the position of the machine relative to the signal's source.

In another embodiment, the present invention further comprises a display means responsive to a signal from the computer for expressing a read-out output. This read-out output from the display can be, for example, indicative of the location or position of the light measuring device relative to the source of the electromagnetic radiation or photosignal. Alternatively, the read-out output from the display can be indicative of the location or depth of the photosensitive mast, and hence the device or machine on which it is located, relative to the source of the electromagnetic radiation or photosignal. "Display" herein can be, for example but is not limited to, a visual display such as an electronic monitor, blinking device, television display, incandescent lamps, and the like, or an audio display, such as a beeper, siren, horn, and the like. It is to be understood by those skilled in the art that other different types and kinds of displays may also be employed. In one embodiment of the present invention, the display is a computer monitor-type display and is mounted inside the operator's cab of an earth moving machine. In another embodiment of the present invention, the display is located at some distance from the machine to which the photosensitive mast is attached, such as when the machine is remotely operated and the operator needs to view or hear the display at a location not on or in the machine. An example of the usefulness of this embodiment is a tunnel mining operation or underwater excavation where the presence of human operators could be extremely hazardous, yet where accurate depth measurement is important.

Another use of the devices of the present invention is in quality control of extrusion processes. In such an embodiment, a light source can be placed over the product of an extrusion such as a fabric or paper making extrusion while the photosensitive mast of the present invention is placed below the extrudate. This system will detect any holes or other non-uniformities by way of light not passing evenly through the extrudate paper or fabric and being detected by the photosensitive mast.

In another utilization of the present invention, the opacity and color, as well as variations in these, can be detected in a fluid. The fluid can be a large natural body of water, such as a sea or lake, or liquid in a vessel, such as a tank or vat.

Yet another use of the present invention comprises several lasers of different colors or wavelengths to thereby facilitate triangulation for exact locating. This is achieved by determining depth and relative location by knowing the angle from the source when measuring the degrees of the arc from two sources. A computer memory could then calculate the exact location which can be relayed to the operator in the cab or elsewhere.

Yet another use of the present invention is determining the three dimensional position of a machine or object relative to a rotating laser. In this use, two or more preferably three photosensitive masts as described herein are mounted on the machine or other body that is to positioned in space. A rotating laser will impinge on the three masts at different times and locations. With this arrangement of the present invention and with a synchronizing signal from the laser source, a method for determining the absolute position of the machine is provided based on mathematical calculations on the timing of the signals and spacing between the masts.

While certain preferred embodiments of the present invention have been disclosed in detail, it is to be understood that various modifications may be adopted without departing from the equivalent of the invention or the literal scope of the following claims.

That which is claimed is:

1. A light monitoring system comprising a) at least one photosensitive mast comprising 100 to 5,000 optical fibers of varying lengths, wherein the optical fibers of the photosensitive mast are arranged along and within said mast, each of said fibers having a receiving end and a terminal end, whereby the receiving ends of the optical fibers are incrementally spaced along the length and around and within the mast, with the receiving ends positioned over the entire length of the mast, and said fibers being gathered into a bundle, one end of which comprises the terminal ends of the fibers and said bundle end is cut and polished; and b) a means for collecting from the polished end of the optical fiber bundle electromagnetic radiation signals received by the photosensitive mast.

2. The system of claim 1 further comprising a computer memory capable of receiving, storing and/or processing information from the collecting means.

3. The system of claim 2 further comprising a display means connected to the collecting means or the computer memory capable of expressing information from the collecting means or the computer memory.

4. The system of claim 3 wherein the display means is selected from the group consisting of a visual electronic monitor, blinking device, television display, incandescent lamps, a beeper, a siren, and a horn.

5. The system of claim 1, wherein the optical fibers are capable of receiving an electromagnetic radiation signal in the wavelength range of from about 400 nanometers to about 2500 nanometers.

6. The system of claim 5, wherein the electromagnetic radiation is laser light emitted from a rotating source.

7. The system of claim 1, wherein the collecting means is a charge coupled device.

8. The system of claim 1 further comprising a means for focusing light from the polished end of the optical fiber bundle.

9. The system of claim 1, wherein the photosensitive mast is mounted on an earth moving or digging machine.

10. A machine comprising the light monitoring system of claim 1.

11. The light monitoring system of claim 1 comprising three photosensitive masts.

12. A machine comprising the light monitoring system of claim 11.

13. An improved omnidirectional photosensitive mast comprising a plurality of optical fibers of varying lengths, said mast being capable of receiving from a 360 degree arc an electromagnetic radiation signal in the wavelength range of from about 400 nanometers to about 2500 nanometers, wherein the optical fibers are aligned along and around a rod, and wherein the receiving ends of the optical fibers are spaced incrementally along and around the length of the rod.

* * * * *